(12) United States Patent
Carter, Jr. et al.

(10) Patent No.: US 7,510,377 B1
(45) Date of Patent: Mar. 31, 2009

(54) ROTOR AIRCRAFT TILTING HUB WITH REDUCED DRAG ROTOR HEAD AND MAST

(75) Inventors: Jay W. Carter, Jr., Burkburnett, TX (US); M. Keith Robinson, Wichita Falls, TX (US); George D. Mitchell, Cloudcroft, NM (US)

(73) Assignee: Cartercopters, L.L.C., Wichita Falls, TX (US)

( * ) Notice: Subject to any disclaimer, the term of this patent is extended or adjusted under 35 U.S.C. 154(b) by 482 days.

(21) Appl. No.: 11/280,117

(22) Filed: Nov. 16, 2005

Related U.S. Application Data (60) Provisional application No. 60/628,395, filed on Nov. 16, 2004.

(51) Int. Cl.
*B63H 3/02* (2006.01)
(52) U.S. Cl. .................................. 416/104; 416/245 R
(58) Field of Classification Search ................. 416/205, 416/208, 245 R, 246, 234, 239; 244/17.27
See application file for complete search history.

(56) References Cited

U.S. PATENT DOCUMENTS 2,210,190 A * 8/1940 Stanley ..................... 244/130
2,829,721 A * 4/1958 Gebhard ..................... 416/24
3,008,671 A * 11/1961 Schneiter .................. 244/17.27
4,212,588 A * 7/1980 Fradenburgh ............... 416/141
4,323,332 A * 4/1982 Fradenburgh ........... 416/134 A
5,301,900 A    4/1994 Groen et al.
5,853,145 A   12/1998 Carter, Jr.
6,024,325 A    2/2000 Carter, Jr.
6,435,453 B1   8/2002 Carter, Jr.
6,527,515 B2   3/2003 Carter, Jr.

OTHER PUBLICATIONS

U.S. Appl. No. 10/782,353, filed Feb. 19, 2004, Carter, Jr.

* cited by examiner

*Primary Examiner*—Edward Look
*Assistant Examiner*—Nathaniel Wiehe
(74) *Attorney, Agent, or Firm*—Bracewell & Giuliani LLP (57) ABSTRACT

A rotor aircraft has a tilting hub for cyclic control operated by either a tilting spindle or swash plate mounted to the upper end of the drive shaft. A spinner housing with two separate half portions encloses the hub. The blades of the rotor have root portions that are integrally joined to the separate half portions. During a collective pitch change, the half portions rotate relative to each other, but at advance ratios greater than about 0.7, when the collective can be held constant, the spinner half portions can be in perfect alignment. Concentric control sleeves surround the drive shaft for changing collective pitch as well as cyclic pitch.

20 Claims, 8 Drawing Sheets

Figure 8

ROTOR AIRCRAFT TILTING HUB WITH REDUCED DRAG ROTOR HEAD AND MAST

CROSS REFERENCE TO RELATED APPLICATION

This application claims the benefit of provisional application Ser. No. 60/628,395 filed Nov. 16, 2004.

FIELD OF THE INVENTION

This invention relates in general to rotor aircraft, and in particular to fairings and control devices for the rotor that are streamlined to reduce drag.

BACKGROUND OF THE INVENTION

One type of rotor aircraft has a rotor, at least one propeller, and wings. The rotor provides most of the lift during short or vertical takeoffs, slow speed flight, and landings, the wings provide most of the lift during cruise conditions. During cruise conditions, the rotor preferably free-wheels at a relatively slow speed. The rotor may be completely undriven in flight, or it may be driven for hovering. For take-offs with the undriven type, the pilot spins the rotor to a high speed while still on the ground. At liftoff, the rotor disengages from the engine, and the inertia of the rotor provides lift for a take-off. The propeller propels the aircraft forward to increase lift provided by the wings.

In the aircraft of the type described as well as the helicopters in general, both the cyclic pitch and the collective pitch are controlled. For collective pitch, with a two-bladed rotor, each blade twists about its feathering axis in opposite directions. Cyclic pitch refers to tilting of the plane of rotation in fore and aft directions as well as from one lateral side to the other. Various control mechanisms are employed to provide the cyclic and collective pitch adjustments. The control mechanisms extend alongside the mast, creating a fairly large mast and masthead assembly, which create drag during high speed flight.

Typically, helicopters do not utilize fairings around the mast or the masthead to reduce drag. The gyroplane described in U.S. Pat. No. 5,853,145 discloses a spinner fairing that fits around the masthead. The blades have cuffs that will twist relative to the spinner fairing to change the collective pitch. That patent also discloses a fairing around the mast.

SUMMARY

In this invention, the rotary aircraft has a spinner housing that encloses the masthead. The spinner housing has two half portions that are movable relative to each other about the feathering axis of each of the blades during collective pitch change. The root of each blade terminates and is rigidly attached to at one of the half portions. A collective pitch mechanism causes each half portion of the spinner housing to twist about its feathering axis in opposite directions to change the collective pitch of the blades. During cyclic pitch change the hub and blades tilt the same direction in unison, as a system, thereby keeping the blades and spinner halves in streamlined alignment relative to each other. Using this method of cyclic control has the additional benefit of eliminating oscillatory feathering from the blade spar.

In the preferred embodiment, the blade shell at the root of each blade is integrally formed with one of the spinner half portions. The two half portions are separated from each other by a gap, which varies in width depending upon the coning plane of rotation of the blades and centrifugal forces. While not rotating, the lower edges of the spinner half portions touch each other to limit the amount of blade droop. While rotating, the gap narrows on the upper side due to coning and widens due to centrifugal forces. The gap on the upper side may close at high coning angles and low centrifugal forces, and conversely, may widen at low coning angles and high centrifugal forces. A seal preferably bridges across the top gap, the seal having an effective width that varies in response to the width of the gap. It is not as important to seal both upper and lower gaps.

Preferably, the aircraft is a gyroplane having wings that provide substantially all of the lift during cruise flight. The rotor provides most of the lift during short or vertical takeoffs, slow speed flight, and landings. Because the rotor is substantially unloaded during cruising conditions. This, the collective pitch can be held fixed during flight above an advance ratio (Mu) of about 0.7. The Mu ratio comprises the tip velocity of the rotor versus the airspeed of the aircraft.

Preferably, the rotor utilizes a tilting hub. The tilting hub can be controlled by; 1) a simple tilting spindle for applications where the rotor does not need to be powered via a drive shaft while in flight or 2) by a swash plate for helicopter applications requiring a powered in flight drive shaft. The spinner for this tilting hub when used with a twistable spar for collective pitch changes can be much smaller and streamlined than in prior art designs.

In another aspect of the invention, the controls for collective pitch and cyclic pitch comprise a pair of sleeves concentrically mounted around the drive shaft. The pitch control sleeves are capable of axial movement along the drive shaft relative to each other. In one embodiment, the lower ends of the sleeves connect to a swash plate assembly that controls movement of the sleeves to change the cyclic pitch and the collective pitch. A mast fairing surrounds the sleeves and other components of the mast. In one embodiment, the mast is tiltable relative to the fuselage, and the lower portion of the mast fairing is curved at a large radius to accommodate movement of the mast fairing in unison with the mast. The concentric sleeves, rather than the prior art swash plate-to-blade links, allow the blades to be positioned on a tall small streamlined mast away from the higher air velocity flowing around the fuselage.

DETAILED DESCRIPTION OF THE INVENTION

Figure 1:
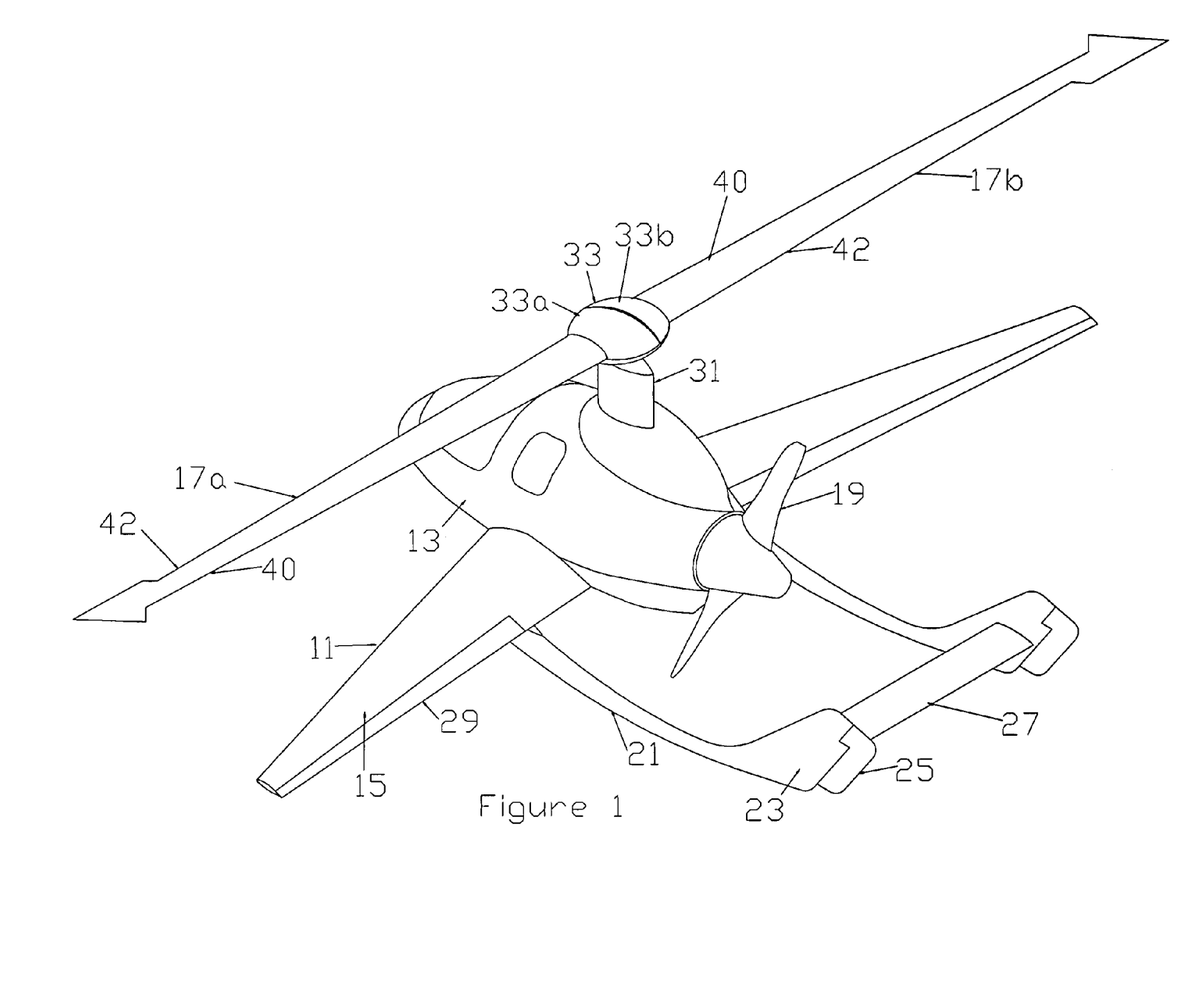
FIG. 1 is a perspective view illustrating a gyroplane constructed in accordance with this invention.

Referring to FIG. 1, gyroplane 11 has a fuselage 13 and a pair of wings 15. A rotor having blades 17*a*, 17*b* is located above fuselage 13 for providing lift during takeoff, slow speed flight and landing. A propeller 19, which is shown as a pusher type but could be reversed, provides propulsion for horizontal flight. Propeller 19 is driven by the same engine that drives the rotor, and could be eliminated if the engine is a jet engine.

Gyroplane 11 has a pair of tail booms 21 with a vertical stabilizer 23 at the ends. A rudder 25 is located on the aft end of each vertical stabilizer 23. A movable elevator 27 may be mounted between stabilizers 23. Also, ailerons 29 may be located at the trailing edge of each wing 15.

A mast fairing 31 encloses the mast assembly between fuselage 13 and rotor blades 17*a*, 17*b*. Also, in the preferred embodiment, a spinner housing 33 encloses the masthead. Spinner housing 33 has two half portions 33*a* and 33*b*. In the preferred embodiment, blade 17*a* has a root portion that is integrally formed with spinner housing half portion 33*a*. Blade 17*b* has a root portion that is integrally formed with spinner housing 33*b*. When viewed from above, as in FIG. 1, spinner housing 33 is circular. When viewed from a side, as shown in FIG. 2, the configuration of spinner housing 33 is elliptical, with the upper and lower portions being symmetrical in the fore and aft direction, about the rotational axis, but not necessarily the same curvature on the upper and lower portions.

Figure 3:
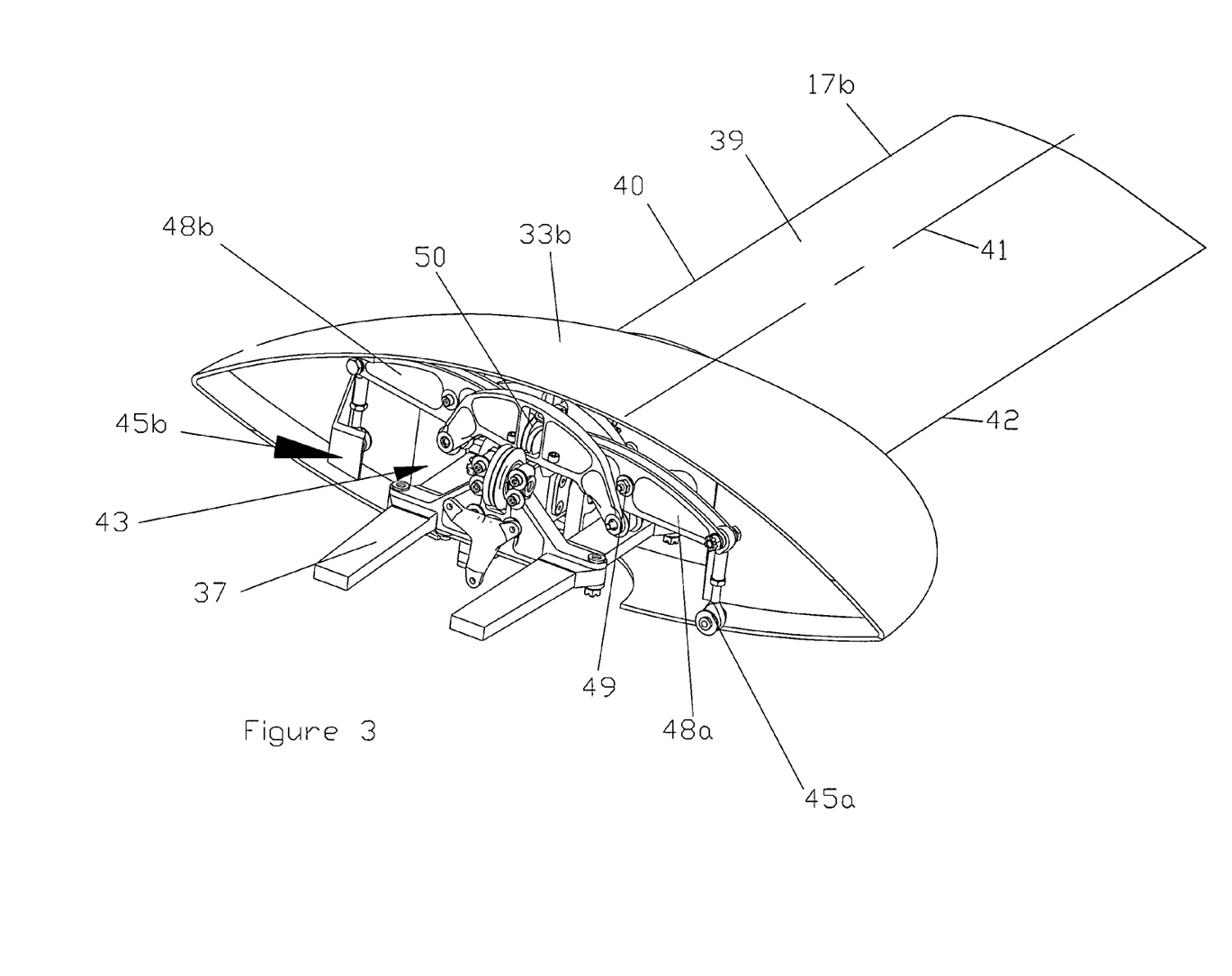
FIG. 3 is an enlarged perspective view of one-half of the spinner housing of the rotor of the gyroplane of FIG. 1.

Referring to FIG. 3, in this embodiment, each blade has two spar caps 37 for providing structural strength. Spar caps 37 comprise composite fiber rods that, in the embodiment shown, extend continuously from near the tip of blade 17*a* to near the tip of blade 17*b*. Spar caps 37 are spread apart from each other at the central area and touch each other in the outer portions of blades 17*a*, 17*b*. Each blade 17*a*, 17*b* has a hollow root shell 39 that encloses the central portion of spar caps 37 and is integrally formed with one of the spinner housing half portions 33*a*, 33*b*. Each blade 17*a*, 17*b* has a feathering axis 41, which is an axis about which the collective pitch changes. When the collective pitch is increased, a leading edge 40 of each blade 17*a*, 17*b* tilts upward relative to its trailing edge 42. When tilting, a rotational action occurs about feathering axis 41. Blade root shells 39 rotate as well as the integrally attached spinner half portions 33*a* and 33*b*. Near the central area, spar caps 37 remain essentially in a single plane and do not undergo significant twisting motion in response to an increase or decrease in collective pitch. For a change in cyclic pitch, spinner half portions 33*a*, 33*b* tilt in unison in fore, aft, and lateral directions.

To those skilled in the art there are two types of cyclic control; one where the entire hub tilts and both blades tilt in the same direction, hereafter referred to as the tilting hub, and another method where the hub does not tilt at all, but each blade is pitched individually. Both hubs discussed here are of the tilting hub type. There are basically two types of methods used to tilt or control the tilting hub. One is with the use of a tilting spindle which we will describe first and the second is with a swash plate and a link to each blade. The tilting spindle is simpler, but difficult to be driven with a drive shaft except over a narrow range of range of motion.

Figure 2:
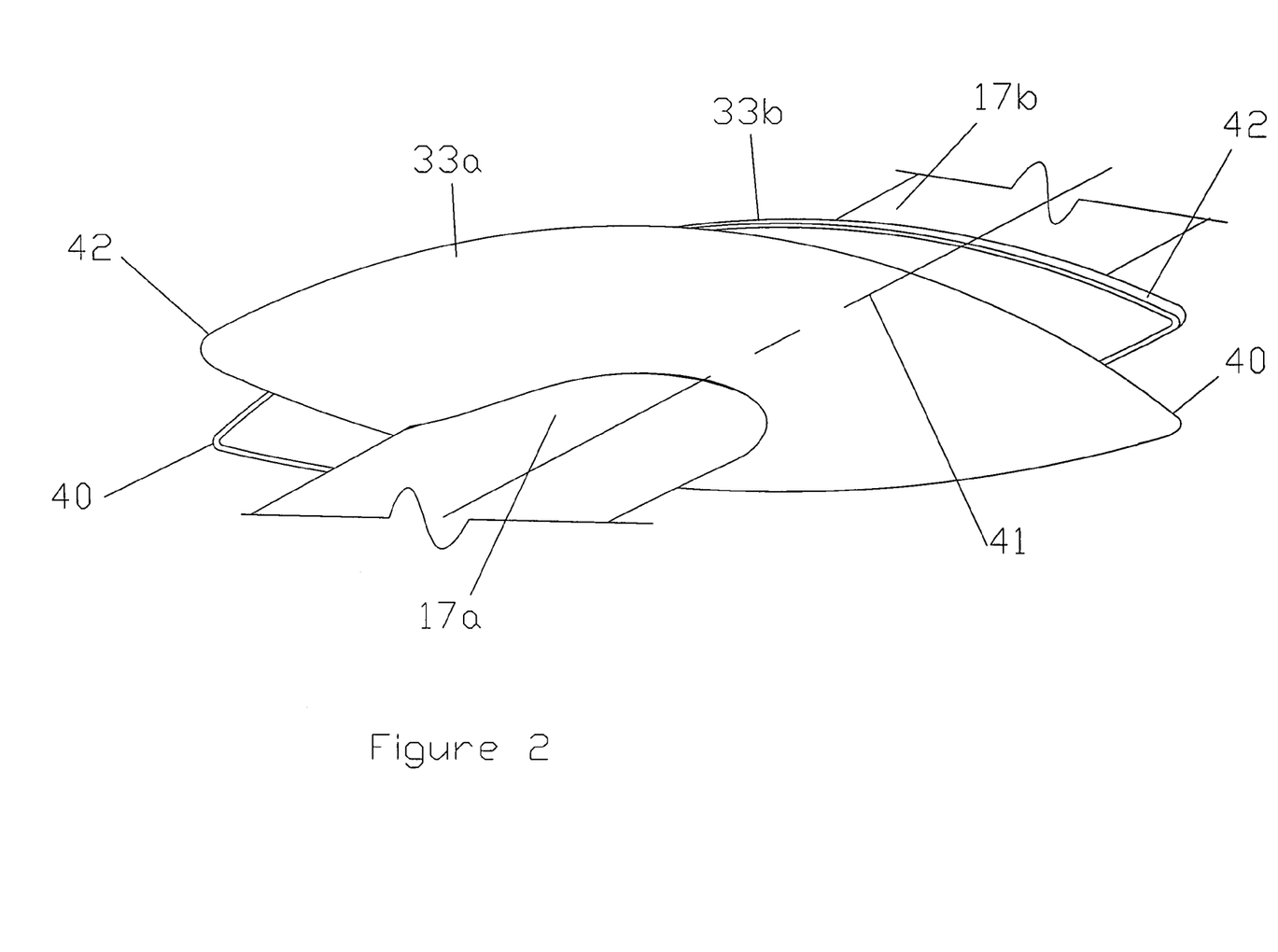
FIG. 2 is an enlarged perspective view of the spinner housing of FIG. 1, showing one of the blades and one-half of the spinner housing pitched relative to the other half of the spinner housing and the other blade.

In the embodiment of FIGS. 1, 2 and 3, the cyclic and collective pitch is preferably controlled by a mechanism similar to that shown in U.S. Pat. No. 5,853,145, all of which material is hereby incorporated by reference. This cyclic control device, sometimes referred to as a tilting spindle, includes a hub 43 that attaches to spar caps 37 and allows the blade to flap or pivot, attached to a spindle housing (not shown), which rotates about a tilting spindle (not shown). Pitch links 45*a*, 45*b* are preferably mounted to blade hub 43. Pitch link 45*b* extends toward leading edge 40 of blade portion 17*b* (FIG. 1) and is secured to a portion of spinner housing half portion 33*b* for causing twisting or rotational motion of spinner housing half portion 33*b* about feathering axis 41. A pitch link 45*a* extends in the opposite direction and is attached to a portion of spinner housing half portion 33*a*. Pitch links 45*a*, 45*b* are attached to pitch link arms 48*a* and 48*b* for pivotal movement about pivot points 49. Pitch links 45*a* and 45*b* can be attached to either the leading or trailing portion of the spinner housing, depending upon the amount and direction of pitch cone coupling desired. As shown, downward movement of cross arm 50 causes each pitch link 45*a*, 45*b* to move upward. Upward movement of pitch links 45*a*, 45*b* pivots the leading edges 40 of advancing blade 17*b* and retreating blade 17*a* upward. Similarly, upward movement of cross arm 50 causes each pitch link 45*a*, 45*b* to move downward, pivoting the leading edges 40 of advancing blade 17*b* and retreating blade 17*a* downward.

Control rods (not shown) engage with the tilting spindle which engages hub 43 and will cause tilting of hub 43 in fore, aft and lateral directions for cyclic pitch changes. In addition, the entire mast of the embodiment of FIGS. 1-4 is selectively tiltable in fore and aft directions. A center control rod or linkage could be attached to cross arm 50 to control collective pitch. This embodiment has a hydraulic cylinder (not shown) attached to cross arm 50 incorporated into hub 43 for collective control.

Figure 4:
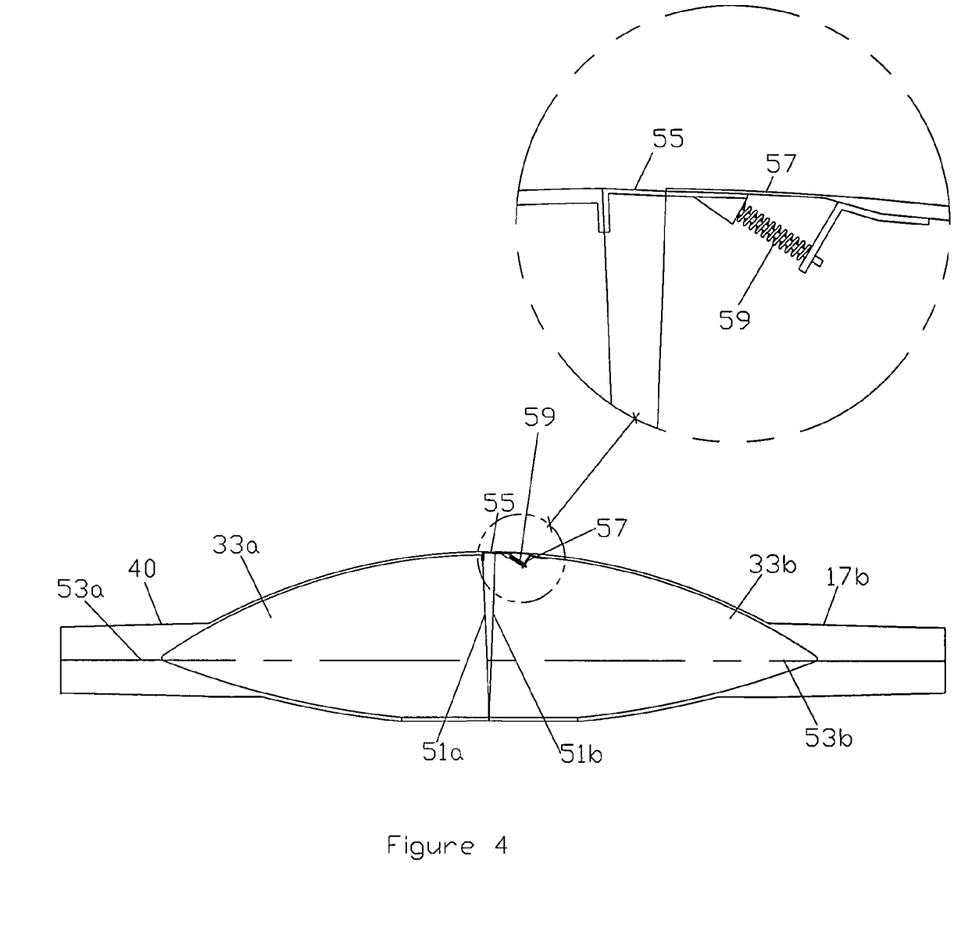
FIG. 4 is an end view, partially sectioned, of the spinner housing of the rotor of FIG. 1, showing the contact of the lower edges of the spinner half portions while the blades are at rest.

Referring to FIG. 4, each spinner housing half portion 33*a*, 33*b* has an inner edge 51*a*, 51*b*. In the position shown in FIG. 4, blades 17*a*, 17*b* are at rest, thus droop in a gradual curve due to weights at the tips of the blades. A plane 53*a* passing through a central portion of blade 17*a* equidistant between its upper and lower edges does not coincide with a similar plane 53*b* of blade 17*b*. Rather, planes 53*a*, 53*b* intersect each other at a small angle. Inner edges 51*a*, 51*b* contact each other on the lower side of spinner 33 to limit the droop. The gap between inner edges 51*a*, 51*b* on the upper side is at a maximum width while blades 17*a*, 17*b* are at rest. While rotating, centrifugal force causes blades 17*a*, 17*b* to straighten and planes 53*a* and 53*b* will change inclinations. During rotation, the gap between inner edges 51*a*, 51*b* on the upper side decreases and on the lower side increases. At maximum blade pitch the blades cone upward and the gap on the upper spinner may decrease, except that the spar stretch due to centrifugal force will cause the gap on both the upper and lower surfaces to increase.

A seal 55 is preferably employed for sealing across the upper side of the gap between edges 51*a*, 51*b*. Seal 55 preferably has an effective width that varies with the changing width of the gap between edges 51*a*, 51*b*. In the type shown, seal 55 is attached to inner edge 51*a* and extends over past inner edge 51*b* to the interior of half portion 33*b*. The upper side of seal 55 engages a seal surface 57 formed in half portion 33*b*. Seal 55 is preferably resilient to provide good sealing contact with seal surface 57. A spring 59 may also be employed to bias the free portion of seal 55 against seal surface 57. Whether the gap between edges 51*a* and 51*b* narrows or increases on the upper side, seal 55 remains in effective sealing engagement.

Figure 5:
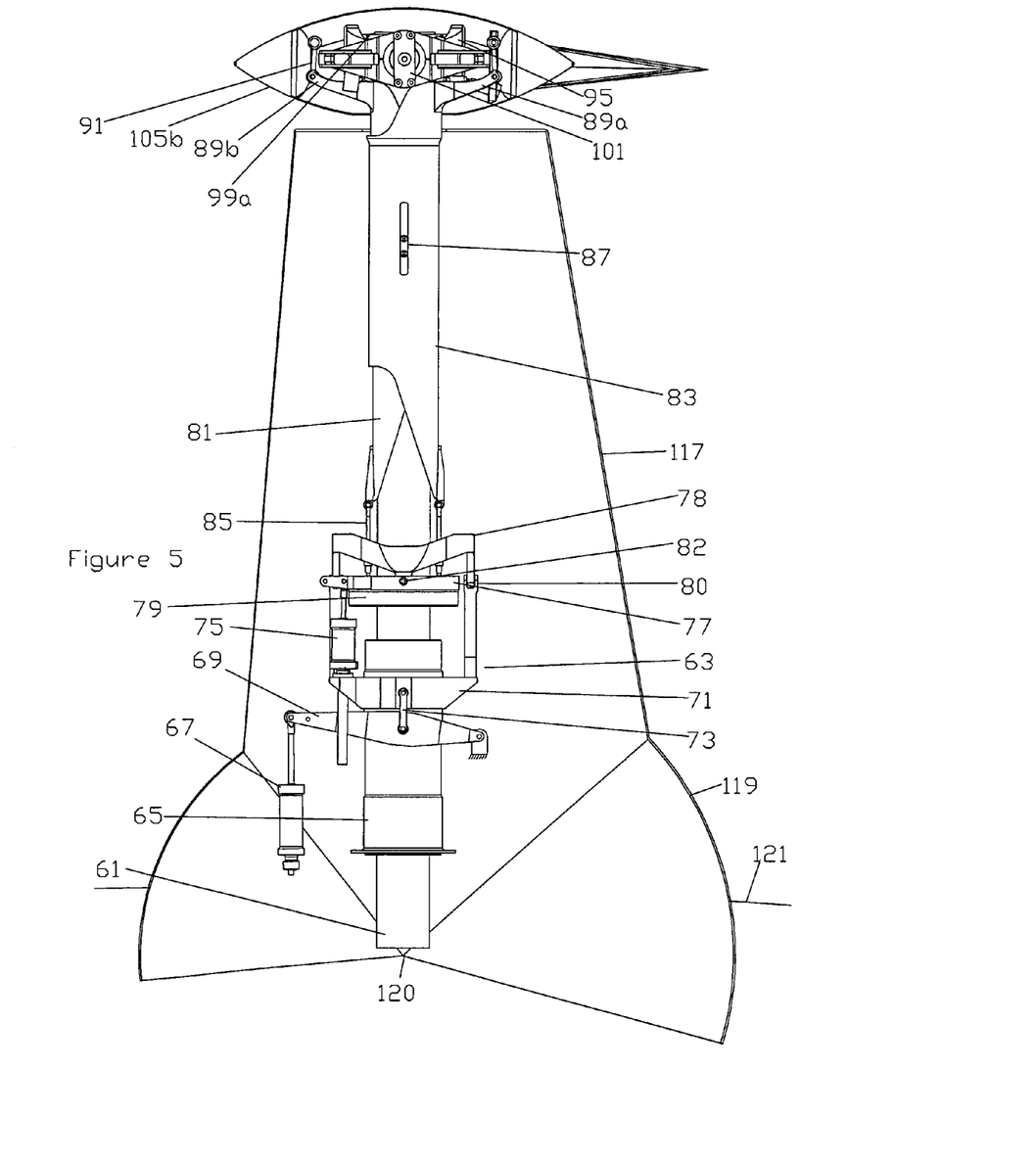
FIG. 5 is a partial sectional view illustrating an alternate embodiment of a mast and masthead assembly for a rotary aircraft, utilizing a drive shaft that may be driven during flight.

FIGS. 5-8 illustrate an embodiment utilizing a rotor that may be driven during flight rather than one that is driven only on the ground, as in FIGS. 1-4. Referring to FIG. 5, a drive shaft 61 is rotated by a gear mechanism and engine (not shown). Drive shaft 61 has a swash plate assembly 63 mounted around it for collective and cyclic pitch control. Swash plate assembly 63 may be of various types. In this embodiment, swash plate assembly 63 includes a non-rotating collective pitch sleeve 65 that encloses drive shaft 61. Collective pitch sleeve 65 is fixed to the airframe, gearbox or tilting mast assembly (not shown) and on the axis of drive shaft 61. A collective pitch hydraulic cylinder 67, when energized, provides axial movement of swash plate assembly 63. Collective cylinder 67 is pivotally connected to a lever ring 69. One end of lever ring 69 is stationary, as indicated schematically in FIG. 5. Lever ring 69 is connected to pivotal link 73 and collar 71. Collar 71 is keyed to sleeve 65 to prevent rotation, but moves axially along the axis of sleeve 65 when collective cylinder 67 strokes upward and downward. Collar 71 is attached axially to upper support 78, which in turn is attached to non-rotating outer swash plate ring 77. Outer swash plate 77 is attached through a bearing to rotating inner swash plate ring 79. The bearing allows the axial motion to transfer from the non-rotational portions to the rotating portions.

As shown more particularly in FIG. 5, two cyclic pitch hydraulic cylinders 75 are mounted to the forward side of collar 71. The upper ends of cyclic cylinders 75 pivotally connect at pivot points 80 to an outer swash plate 77. Pivot points 80, 82 are 90 degrees apart from each other, forming a gimbal arrangement. Outer swash plate 77 can be tilted by cyclic cylinders 75 in fore and aft directions and lateral directions. When cyclic cylinders 75 stroke in unison, tilting is in fore and aft directions. When one cyclic cylinder 75 strokes upward and the other downward, the tilting is lateral to one side or the other. Outer swash plate 77 has freedom to tilt fore, aft about pivots 82 and tilt laterally about pivots 80. An inner swash plate 79 is fixed to outer swash plate 77 in all planes except rotationally. This tilting motion is transferred to the inner swash plate which pushes and pulls drive links 85 up and down in a sinusoidal fashion as they rotate around the axis of drive shaft 61. Cyclic cylinders 75 are slave cylinders that are controlled by control rods, cables or electronically from the cockpit.

An inner pitch control sleeve 81 is mounted around drive shaft 61 and enclosed by an outer pitch control sleeve 83. Each pitch control sleeve 81, 83 is connected on its lower end by a hinged drive link 85 to rotating swash plate 79. Drive links 85 are 180 degrees apart from each other around drive shaft 61. Pitch control sleeves 81, 83 rotate in unison with drive shaft 61 by means of a drive key 87. Both sleeves 81, 83 are able to move up and down along the axis of drive shaft 61. This movement is independent of each other, thus inner sleeve 81 is able to move axially relative to outer sleeve 83 and vice versa. Pitch control sleeves 81, 83 move in unison along the axis of drive shaft 61 when collective pitch cylinder 67 strokes up and down. When cyclic pitch cylinders 75 move, swash plate 79 tilts relative to a plane perpendicular to the axis drive shaft 61. When swash plate 79 is tilted, each pitch control sleeve 81, 83 will stroke up and down independently of the other with each revolution of drive shaft 61.

Figure 6:
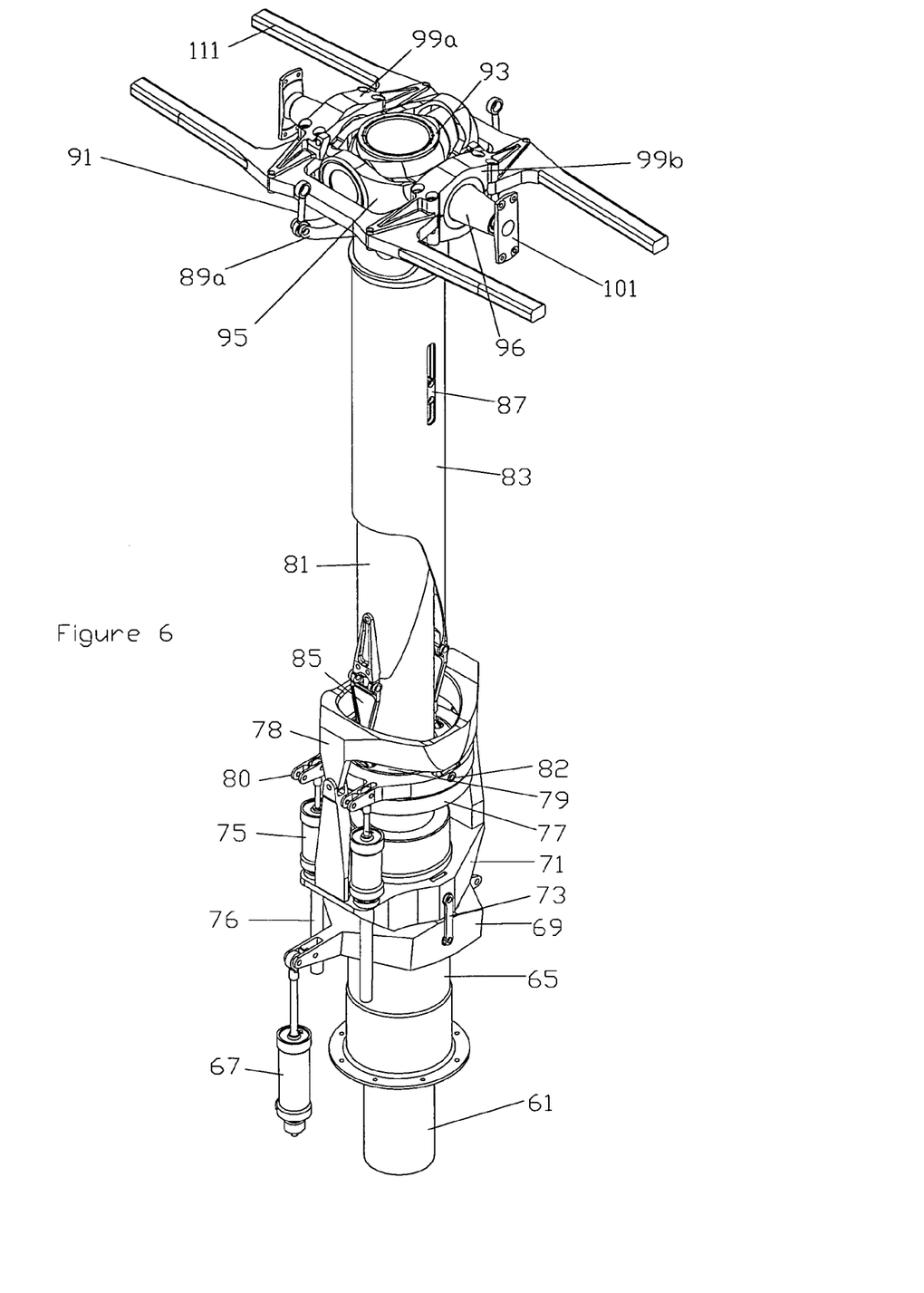
FIG. 6 is a perspective view of the mast and masthead of FIG. 5, with the spinner housing, blade shells, and mast fairing removed.

Referring still to FIGS. 5 and 6, a pitch horn arm 89b extends from one of the sleeves, which in this embodiment is inner pitch control sleeve 81. A pitch horn arm 89a extends from pitch control sleeve 83. Each pitch horn arm 89a, 89b has a pivotal pitch link 91 on its upper end. The masthead assembly includes an inner gimbal 93, shown also in FIG. 7, which is rigidly attached to the upper end of drive shaft 61 for rotation therewith. Gimbal member 93 has two pin portions that extend into pivotal engagement with an outer gimbal member 95. Outer gimbal member 95 is able to pivot about an axis 97, called a flapping axis, relative to inner gimbal 93 and drive shaft 61. Outer gimbal member 95 has two pins 96 that extend perpendicular to the pins of inner gimbal 93. A hub 99 having two portions 99a, 99b, is pivotally mounted to pins 96. A pivot stud 101 is mounted to the outer end of each pin 96 and is rotatable relative to outer pin 96. Hub 99 is pivotal about a feathering axis 103 that is perpendicular to flapping axis 97.

Figure 7:
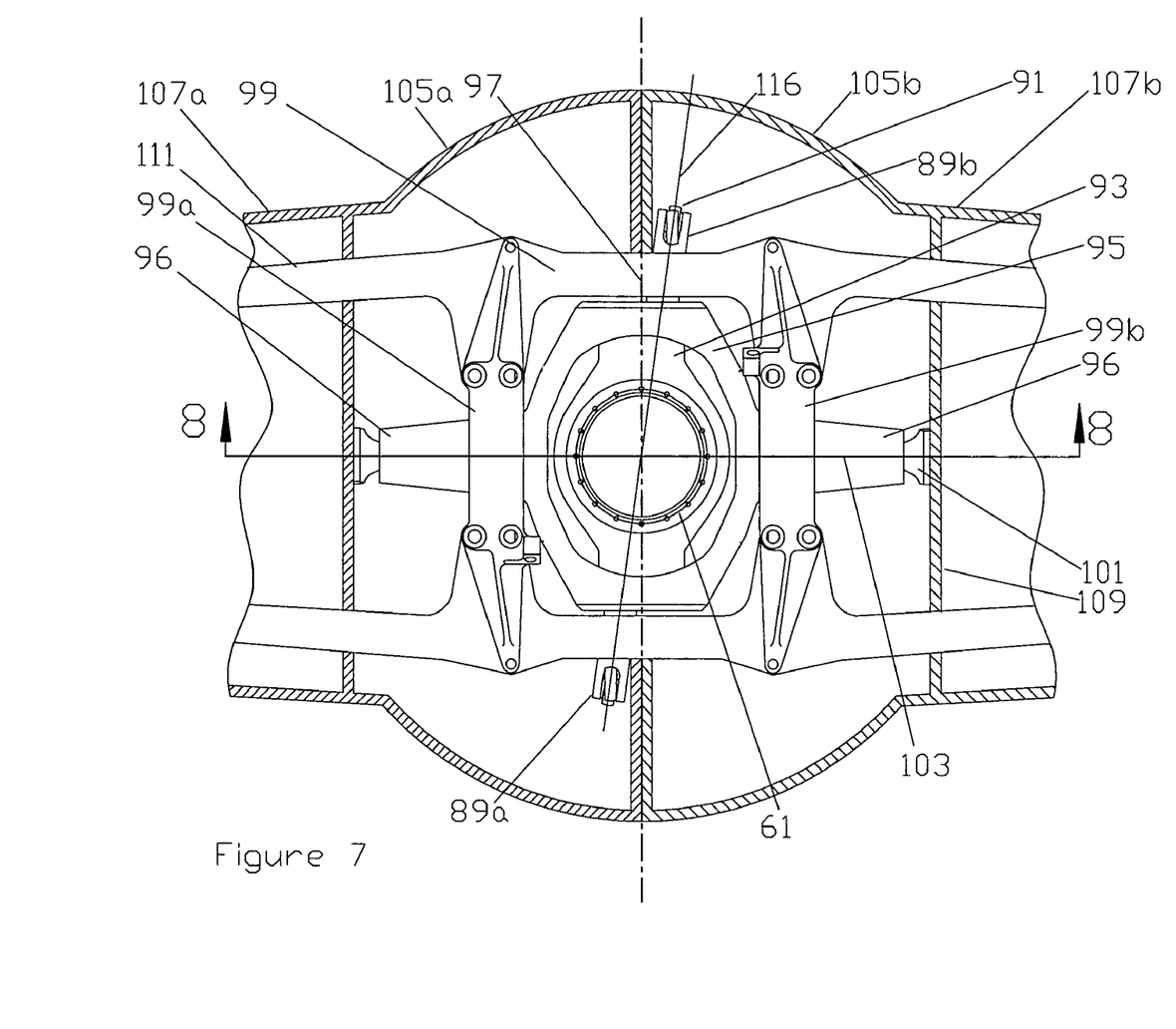
FIG. 7 is a sectional view of the masthead and spinner housing of FIG. 5, taken along the line 7-7 of FIG. 8.
Figure 8:
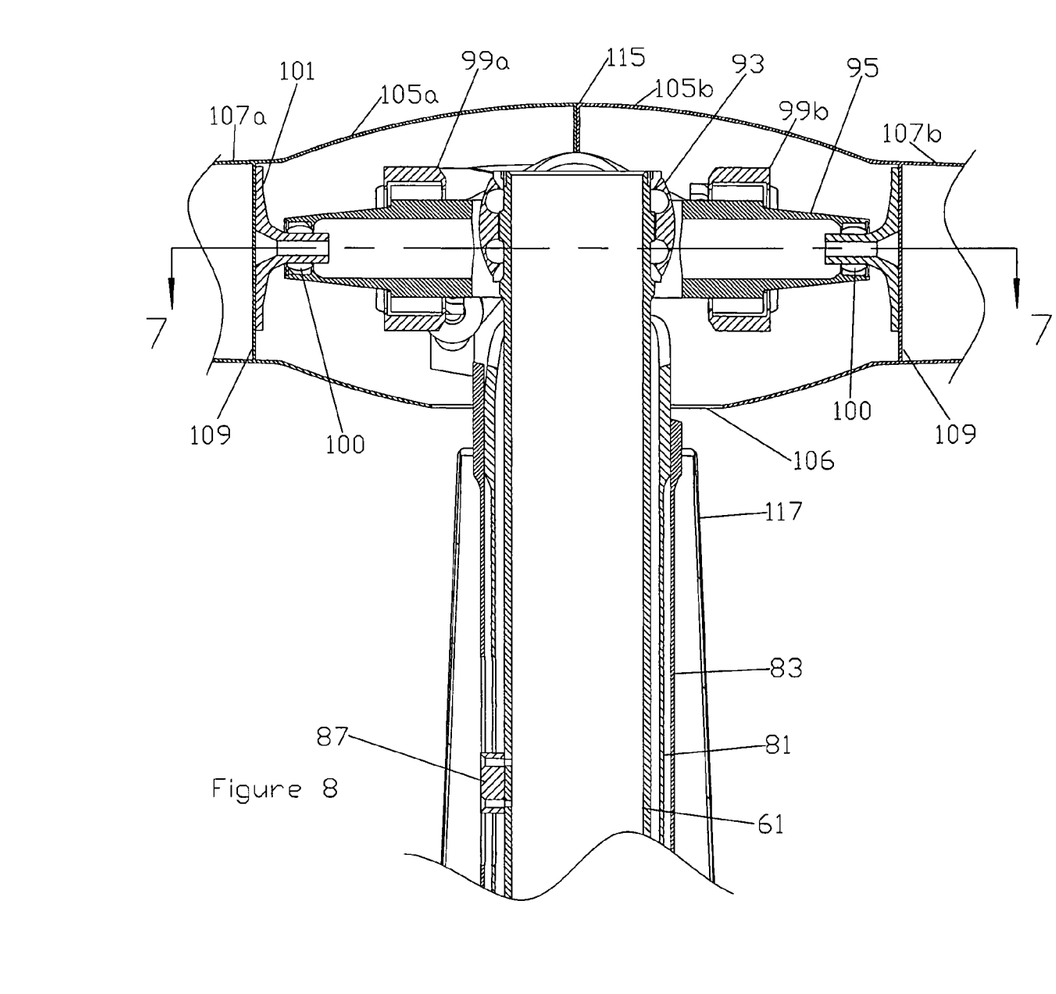
FIG. 8 is a partially sectioned view of the masthead and spinner housing of FIG. 5 taken along the line 8-8 of FIG. 7.

A spinner housing half portion 105a encloses one-half of the masthead components as shown in FIG. 7. Spinner housing half portion 105b encloses the other half of the masthead components. Spinner housing half portions 105a, 105b comprise hollow members that are of the same general external configuration as spinner 33 of FIG. 1. Half portions 105a, 105b define a central hole 106 through which drive shaft 61 passes as shown in FIG. 8. Preferably, a seal (not shown) similar to seal 55 (FIG. 4), is located between the inner edges of half portions 105a, 105b on the upper side. Blade root shell 107a integrally joins spinner housing half portion 105a, and blade root shell portion 107b integrally joins spinner housing half portion 105b. A bulkhead 109 is located within each blade shell portion 107a, 107b, generally in a plane perpendicular to gimbal pins 96. Fasteners connect pivot stud plates 101 to bulkheads 109.

The blades include spar caps 111 spaced apart from each other in the central area, and masthead hub portions 99a, 99b are rigidly attached to spar caps 111. Preferably, each spar cap 111 is a continuous member extending from near the tip of one blade to near the tip of the other blade. The portions of spar caps 111 connected to and between hub portions 99a, 99b are considered to be part of the hub assembly.

Pitch link 91 of pitch horn arm 89a is attached to the rear or trailing edge portion of spinner housing half portion 105b, near its inner edge 115. Similarly, pitch link 91 of pitch horn arm 89b is attached to the rear or trailing edge portion of spinner housing half portion 105a near its inner edge 115. This attach point of pitch link 91 to the trailing edge side of the spinner produces a negative pitch cone coupling such that when the blade cones up and pivots about bearing 100, the blade pitch is reduced. The connection points are offset from the central axis of drive shaft 61 and from feathering axis 103. Line 116 (FIG. 7) is referred to as a Delta 3 line and extends between the pivotal connection points of pitch links 91. Line 116 is at a selected angle relative to flapping axis 97.

Referring to FIG. 8, a mast fairing 117 encloses pitch control sleeves 81, 83 and drive shaft 61. Fairing 117 is aerodynamically contoured, having a narrower width in the lateral direction than its length in the longitudinal direction, similar to mast fairing 31 of FIG. 1. The mast of this embodiment optionally may be a type that is tiltable in fore and aft directions. If so, as shown in FIG. 5, mast fairing has a lower portion 119 that is curved when viewed in a plane containing the axis of drive shaft 61. Curved lower portions 119 are located on the forward and rearward sides of mast fairing 117 to provide a generally spherical contour about the mast pivot axis 120 when viewed in the cross-section of FIG. 5. The radius of each curved lower portion 119 intersects the other on the axis of drive shaft 61 at the pivot point 120 about which drive shaft 61 tilts. Curved lower portions 119 enable mast fairing 117 to tilt with drive shaft 61 relative to fuselage 121. Spherical lower portions 119 are closely spaced to an edge portion of fuselage 121 and rotate into and out of a cavity provided in fuselage 121.

In the operation of the embodiment of FIGS. 5-8, drive shaft 61 rotates the masthead assembly, which includes gimbal portions 93, 95, hub 99 and spinner half portions 105a, 105b. For a change in collective pitch, either the operator or an automatic control mechanism will cause cylinder 67 (FIG. 5) to extend or retract, resulting in the entire swash plate assembly 63 moving upward or downward. Collective pitch hydraulic cylinder 67, when energized, provides axial movement, up and down, of collar 71, upper support 78, non-rotating outer swash plate 77, rotating inner swash plate 79, drive links 85, inner and outer pitch control sleeves 81 and 83, pitch links 91 all along the axis of collective pitch sleeve 65 and drive shaft 61. Both pitch horn arms 89 will move upward and downward in unison with each other, causing spinner housing half portion 105a to rotate or twist in one direction about feathering axis 103 while spinner housing half portion 105b twists in the opposite direction about feathering axis 103. Hub 99 and the central portions of spar caps 111 remain stationary during this collective pitch change. While at cruise speeds, the collective pitch will be zero or near zero, in which case hub housing portions 105a and 105b will be aligned with each other.

The cyclic pitch is changed by the operator control of the control stick or automatically (not shown). To cause tilting in the fore and aft direction, both cyclic cylinders 75 move in unison, tilting swash plate 79 in the fore and aft directions. Sleeves 81, 83 transmit this tilting movement through pitch horn arms 89a, 89b and spinner half portions 105a, 105b to hub 99, causing hub 99 to assume the same tilt as swash plate 79. For lateral tilting, one cyclic cylinder 75 (FIG. 6) will stroke upward while the other strokes downward. This tilts swash plate 79, pitch control sleeves 81, 83, pitch horn arms 89a, 89b and spinner half portions 105a, 105b to cause hub 99 to assume the same tilt in the lateral direction.

Whether fore and aft, lateral, or a mixture of the two, the tilt will cause pitch control sleeves 81 and 83 to move up and down relative to each other during each rotation of drive shaft 61. Tilting hub 99 in this manner does not change the collective pitch previously set by collective cylinder 67. For example, if the tilt is downward in the forward direction, the upper end of each pitch horn 89a, 89b will revolve around an inclined plane from a lower position to an upper position relative to drive shaft 61. Changing the inclination of the plane of rotation of the upper ends of pitch horns 89a, 89b does not change the collective pitch. Changing the axial position of the plane of rotation of the upper ends of pitch horns 89a, 89b does change the collective pitch.

The invention has significant advantages. The fairings for the masthead and mast reduce drag, which is particularly significant at high speeds. The use of a tilting hub for cyclic control operated by either a tilting spindle or swash plate enables the spinner halves to stay aligned (very streamlined) at a fixed collective used when the rotor advance ratio (Mu) is greater than approximately 0.7 (high speed, slow rotor flight). The use of concentric sleeves around the drive shaft for cyclic and collective pitch changes enables the mast assembly to be smaller in width than if control rods extended up alongside the mast. The reduction in width allows the use of a narrow aerodynamic mast fairing. The curved portions of the fore and aft sides of the mast fairing enable a tilting mast to be employed and maintain a small clearance gap between the mast fairing and the fuselage. The twistable spar for collective pitch control further reduces the size of the rotor spinner.

While the invention has been shown in only two of its forms, it should be apparent to those skilled in the art that it is not so limited but is susceptible to various changes without departing from the scope of the invention.

We claim:

1. An aircraft, comprising:
    a fuselage;
    a mast extending upward from the fuselage, terminating in a masthead;
    a pair of rotor blades, each of the blades extending from the masthead along a feathering axis;
    a spinner housing enclosing the masthead, the spinner housing having two half portions that are movable relative to each other about the feathering axis of each of the blades, each of the blades terminating at one of the half portions; and
    a collective pitch mechanism that causes each half portion of the spinner housing to twist about its feathering axis in opposite directions relative to each other to change the collective pitch of the blades.

2. The aircraft according to claim 1, wherein each of the blades comprises:
    a shell that is rigidly attached to one of the spinner housing half portions.

3. The aircraft according to claim 1, wherein the spinner housing is substantially circular between the blades when viewed in a horizontal cross-section, and elliptical when viewed in a vertical cross-section.

4. The aircraft according to claim 1, further comprising:
    a seal located between inner edges of the two spinner housing half portions.

5. The aircraft according to claim 1, further comprising:
    a seal assembly that seals across a gap between inner edges of the two spinner housing half portions, the seal assembly having an effective width that varies in response to a width of the gap, which changes under various flight conditions.

6. The aircraft according to claim 1, wherein each of the spinner housing half portions has an inner edge, the inner edges on an upper side of the spinner housing being spaced apart from each other by a gap, the width of which varies in response to movement of the blades during flight, the inner edges on a lower side of the spinner housing contacting each other when the blades are stationary to provide a droop stop.

7. The aircraft according to claim 1, further comprising:
    a first seal member stationarily mounted to an inner edge portion of a first one of the spinner housing half portions, the first seal member having a sealing surface that is biased into engagement with an inner edge portion of a second one of the half portions, the second one of the half portions being movable relative to the sealing surface.

8. The aircraft according to claim 1, wherein the collective pitch mechanism comprises:
    a pitch horn mounted to each of the spinner half portions, one of the pitch horns being offset from the feathering axis in one direction, and the other of the pitch horns being offset from the feathering axis in the opposite direction, so that upward and downward movement of the pitch horns in unison with each other causes twisting of each of the spinner half portions in opposite directions;
    inner and outer concentric sleeves encircling the mast, each of the sleeves being connected to one of the pitch horns, so that upward and downward movement of the sleeves in unison with each other and relative to the mast causes collective pitch and a rotation about the feathering axis of each of the spinner half portions in opposite directions.

9. The aircraft according to claim 1, wherein the mast comprises a rotatably driven drive shaft, and the masthead comprises:
  a gimbal mounted to the drive shaft for rotation therewith; and
  a hub mounted to the gimbal, the rotor blades being mounted to the hub, the gimbal allowing the hub to tilt in fore and aft and in lateral directions relative to the drive shaft; and wherein
  the spinner housing tilts in unison with the hub.

10. An aircraft, comprising:
  a fuselage;
  a drive shaft extending upward from the fuselage;
  a hub mounted to an upper end of the drive shaft by a gimbal, which allows tilting movement of the hub relative to the drive shaft while rotating in unison with the drive shaft;
  a plurality of rotor blades, each of the blades secured to the hub; and
  inner and outer sleeves encircling the drive shaft and rotatable in unison with the drive shaft, the sleeves having upper ends cooperatively engaged with the hub for causing tilting of the hub relative to the drive shaft in response to upward and downward movement of the sleeves relative to each other.

11. The aircraft according to claim 10, further comprising:
  a swash plate assembly cooperatively engaged with lower ends of the sleeves for selectively moving the sleeves upward and downward relative to the drive shaft and to each other.

12. The aircraft according to claim 10, wherein the drive shaft is selectively tiltable relative to the fuselage, and the aircraft further comprises a mast fairing enclosing the inner and outer sleeves and the drive shaft and being tiltable relative to the fuselage in unison with the drive shaft.

13. The aircraft according to claim 10, further comprising:
  a spinner housing enclosing the hub, the spinner housing having two half portions separated from each other by a gap, each of the blades having a root portion joined to one of the half portions for movement therewith; and
  wherein the spinner housing half portions are rotatable relative to each other in response to selected movement of the sleeves to vary the collective pitch of the blades.

14. The aircraft according to claim 10, further comprising:
  a swash plate encircling and rotating in unison with the drive shaft, each of the sleeves being coupled to the swash plate at circumferentially spaced apart points;
  a collective pitch control that selectively moves the swash plate and each of the control sleeves axially along an axis of the drive shaft to vary a collective pitch of the blades; and
  a hub tilting control that selectively tilts the swash plate and causes the sleeves to move axially relative to each other and to the drive shaft for tilting the hub.

15. An aircraft, comprising:
  a fuselage;
  a rotatable drive shaft extending upward from the fuselage along a drive shaft axis;
  a hub mounted by a gimbal arrangement to an upper end of the drive shaft for rotation with the drive shaft and tilting movement relative to the drive shaft;
  a spinner housing having two separate half portions, each mounted to an opposite side of the hub;
  a pair of rotor blades, each of the blades having a root portion integrally joined with one of the half portions of the spinner housing for movement therewith;
  a pair of sleeves concentrically mounted around the drive shaft for rotation therewith, each of the sleeves being axially movable relative to each other and to the drive shaft, each of the sleeves being cooperatively engaged with one of the half portions of the spinner housing;
  a sleeve control mechanism that has one mode in which both sleeves move in unison axially relative to the drive shaft to cause the half portions of the spinner housing to twist in opposite directions relative to each other to change a collective pitch of the blades;
  the sleeve control mechanism having another mode in which the sleeves move axially relative to each other and to the drive shaft to tilt the hub and the spinner housing; and
  a fairing that extends upward from the fuselage and encloses the sleeves.

16. The aircraft according to claim 15, wherein the drive shaft and the fairing are tiltable in unison relative to the fuselage.

17. The aircraft according to claim 15, wherein:
  the half portions of the spinner housing have inner edges that are opposed to each other;
  the inner edges on an upper side of the spinner housing are separated by a gap that varies in width depending upon the inclinations of the blades relative to each other; and wherein the aircraft further comprises:
  a seal assembly that extends across and seals the gap, the seal assembly having an effective width that varies proportionally with the width of the gap.

18. The aircraft according to claim 15, wherein:
  the half portions of the spinner housing have inner edges that are opposed to each other and separated by a gap on upper and lower sides of the spinner housing when the blades are rotating in a common plane; and
  when the blades are at rest, the inner edges along the lower side of the spinner housing contact each other to limit droop of the blades.

19. The aircraft according to claim 15, wherein the spinner housing has an external surface that is substantially circular between blades when viewed in a first cross-section transverse to the axis, and is elliptical when viewed in a second cross-section perpendicular to the first cross-section.

20. The aircraft according to claim 15, wherein the root portion of each of the blades comprises:
  a pair of spar caps that extend along lengths of each of the blades, each of the spar caps being secured to the hub for movement therewith; and
  a shell, each shell integrally joined to one of the spinner housing half-portions, each of the shells being cooperatively engaged with one of the sleeves, enabling the shells to rotate along with the spinner housing half-portions relative to the spar caps and the hub to change collective pitch.

* * * * *